(12) United States Patent  
Yoeli

(10) Patent No.: US 6,568,630 B2
(45) Date of Patent: May 27, 2003

(54) DUCTED VEHICLES PARTICULARLY USEFUL AS VTOL AIRCRAFT

(75) Inventor: Rafi Yoeli, Tel Aviv (IL)

(73) Assignee: Urban Aeronautics Ltd., Ben-Gurion Airport (IL)

( * ) Notice: Subject to any disclaimer, the term of this patent is extended or adjusted under 35 U.S.C. 154(b) by 0 days.

(21) Appl. No.: 09/932,924

(22) Filed: Aug. 21, 2001

(65) Prior Publication Data

US 2003/0038213 A1 Feb. 27, 2003

(51) Int. Cl.$^7$ .............................................. B64C 29/00
(52) U.S. Cl. .................. 244/23 R; 244/12.3; 244/23 B; 244/55; 244/56; 244/12.4
(58) Field of Search .......................... 244/2, 12.1, 12.2, 244/12.3, 12.4, 12.5, 23 R, 23 A, 23 B, 23 C, 23 D, 55, 56, 54

(56) References Cited

U.S. PATENT DOCUMENTS 2,936,969 A * 5/1960 Griffith et al. ............. 244/12.3
3,082,977 A * 3/1963 Arlin .......................... 244/12.2
3,187,817 A * 6/1965 Colley ........................ 244/12.1
3,276,528 A * 10/1966 Tucknott et al. ........... 244/23 R
3,614,030 A * 10/1971 Moller ....................... 244/23 C
6,254,032 B1 * 7/2001 Bucher ....................... 244/12.3

FOREIGN PATENT DOCUMENTS

IT           666076    *  8/1964    ................. 244/12.3
SE           184314    *  6/1963    ................. 244/12.3

* cited by examiner

Primary Examiner—Galen L. Barefoot
(74) Attorney, Agent, or Firm—G. E. Ehrlich Ltd.

(57) ABSTRACT

A VTOL aircraft (or other vehicle such as a sea vehicle) includes a pair of elongated ducts on opposite sides of the vehicle body, and a plurality of powered propellers (or other propulsion units such as jet engines) mounted within and enclosed by each of the elongated ducts, such as to produce an upward lift force to the vehicle. Each of the elongated ducts has a short transverse dimension slightly larger than the diameter of the blades of each propeller enclosed thereby, and a large transverse dimension slightly larger than the sum of the diameters of the blades of all the propellers enclosed thereby.

18 Claims, 3 Drawing Sheets

DUCTED VEHICLES PARTICULARLY USEFUL AS VTOL AIRCRAFT

FIELD AND BACKGROUND OF THE INVENTION

The present invention relates to vehicles movable within an ambient fluid, such as air or water. The invention is particularly useful in VTOL (Vertical Take-off and Landing) aircraft, and is therefore described below with respect to this application.

Many different types of VTOL aircraft have been proposed where the weight of the vehicle in hover is carried directly by rotors or propellers, with the axis of rotation perpendicular to the ground. One well known vehicle of this type is the conventional helicopter which includes a large rotor mounted above the vehicle fuselage. Other types of vehicles rely on propellers that are installed inside circular cavities, shrouds, ducts or other types of nacelle, where the propeller or rotor is not exposed, and where the flow of air takes place inside a circular duct. Most ducts have uniform cross-sections with the exit area (usually at the bottom of the duct when the vehicle is hovering) being similar to that of the inlet area (at the top of the duct). Some ducts, however, are slightly divergent, having an exit area that is larger than the inlet area, as this was found to increase efficiency and reduce the power required per unit of lift for a given inlet diameter. Some ducts have a wide inlet lip in order to augment the thrust obtained, especially in hover.

One of the areas where VTOL vehicles are usually more challenging than fixed wing aircraft is the area of stability and control. The main difficulty stems from the fact that, contrary to fixed wing aircraft which accelerate on the ground until enough airspeed is achieved on their flight surfaces, VTOL vehicles hover with sometimes zero forward airspeed. For these vehicles, the control relies on utilizing the rotors or propellers themselves, or the flow of air that they produce, to create control forces and moments around the vehicle's center of gravity (CG).

One method, which is very common in helicopters, is to mechanically change, by command, the pitch of the rotating rotor blades both collectively and cyclically, and to modify the main thrust as well as moments and/or inclination of the propeller's thrust line that the propeller or rotor exerts on the vehicle. Some designs use four or more separate propellers, and change the collective angle of all the blades on each propeller. The use of four propellers with collective blade pitch control eliminates the added complexity of changing the angle of each blade individually (termed cyclic control) when using a single rotor for the complete vehicle. On vehicles using multiple propellers/fans which are relatively far from the CG, differential collective control settings can therefore be used on each fan to produce the desired control moments. Another method which can sometimes be used is to rely on fixed pitch propellers, but to change their rotational speed with respect to each other to obtain the increase/decrease of thrust desired from each propeller.

The Curtiss-Wright VZ-7 (VTOL Military Research Aircraft; Mike Rogers, Orion Books N.Y., 1989) is an example of a vehicle in which pitch and roll motions are controlled by changing the blade pitch angle on four free (i.e. unducted) propellers mounted to the sides of a central, elongated fuselage. The Igor Bensen B-12 'SkyMat' (Janes 'All the World's Aircraft'; Janes publications 1962, England), illustrates an example of a vehicle utilizing a plurality of fixed pitch propellers each mounted to a separate engine. Control moments are generated by increasing and decreasing the RPM on the engines which are mounted on different ends of the vehicle. The propellers are unducted, and the vehicle resembles somewhat the configuration of the VZ-7 but with many more exposed and unducted propellers. In such arrangements, each propeller is exposed and unprotected.

The Paul Moller M200X (Popular Science, March 2000 Times Mirror Magazines), uses a plurality of internally mounted propellers inside ducts. However, each propeller has its own duct which adds to the overall weight of the vehicle; and the area between the propellers is blocked to the air flow which does not enable maximum deck surface of the vehicle to be utilized for lift.

U.S. Pat. No. 6,179,247 describes a VTOL aircraft vehicle in which an annular array of powered thrusters, e.g., rotary propellers, are mounted within an annular duct circumscribing the vehicle with the passenger compartment located centrally of the annular duct. Such an arrangement, among other disadvantages, makes it difficult for the passenger or passengers to enter and exit

OBJECTS AND BRIEF SUMMARY OF THE INVENTION

An object of the present invention is to provide a vehicle generally, and particularly a VTOL aircraft which, having advantages in one or more of the above respects.

According to one aspect of the present invention, there is provided a vehicle movable within an ambient fluid, comprising: a vehicle body; a first group of rotary propeller propulsion units mounted on one side of the vehicle body, each of the rotary propeller propulsion units being oriented to produce a downward flow of the fluid and thereby an upward lift force applied to that side of the vehicle body; a second group of rotary propeller propulsion units mounted on the opposite side of the vehicle body, each of the latter rotary propeller propulsion units being oriented to produce a downward flow of the fluid, and thereby an upward lift force applied to the opposite side of the vehicle body; a first elongated duct on the one side of the vehicle body enclosing all the rotary propeller propulsion units of the first group and having an upper end and a lower end projecting past the upper and lower ends of the enclosed rotary propeller propulsion units; and a second elongated duct, separate from the first elongated duct, located on the opposite side of the vehicle body and enclosing all the rotary propeller propulsion units of the second group, the second elongated duct having an upper end and a lower end projecting past the upper and lower ends of the second group of rotary propeller propulsion units; the cross-sectional area of each of the first and second elongated ducts being larger than the sum of the cross-sectional areas of the plurality of rotary propeller propulsion units enclosed by the respective elongated duct, to increase the efficiency whereby the lift force is produced by the respective rotary propeller propulsion units; the ends of the first and second elongated ducts being spaced from each other to facilitate entry and exit from the vehicle.

According to further features in the preferred embodiments of the invention described below, the upper inlet end of each elongated duct is circumscribed by a curved surface which guides smoothly the fluid flow into the duct and also further augment the lift force produced by the propulsion units, through the Bernoulli effect.

As will be described more particularly below, the invention is implemented in a VTOL aircraft in which the propulsion units are rotary propellers. While using a plurality of propellers within a single duct will have some detrimental effect on the thrust augmentation achieved by the duct because of the inability to completely avoid gaps between propellers and the duct walls, such an arrangement still provides some augmentation, while keeping the propellers protected inside the fuselage, while at the same time enabling a simple control scheme to be used for controlling the vehicle in flight. It is also believed that, although some regions inside the duct have no propellers directly acting on the air stream, the overall flow through the duct will be relatively uniform as long as the propellers are not separated too far from each other.

It is believed, therefore, that a vehicle constructed in accordance with the foregoing features, particularly a VTOL aircraft including propellers as the propulsion units, will provide a number of important advantages including the following: since the propellers are inside ducts and within the confines of the fuselage, the arrangement provides protection to the propeller blades, as well thrust augmentation by the duct. In addition, the total duct cross-sectional area is larger than the sum of the separate cross-sectional areas of each propeller. Further, the thrust of each propeller can be changed, so that a simple scheme for creating control movements can be obtained.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
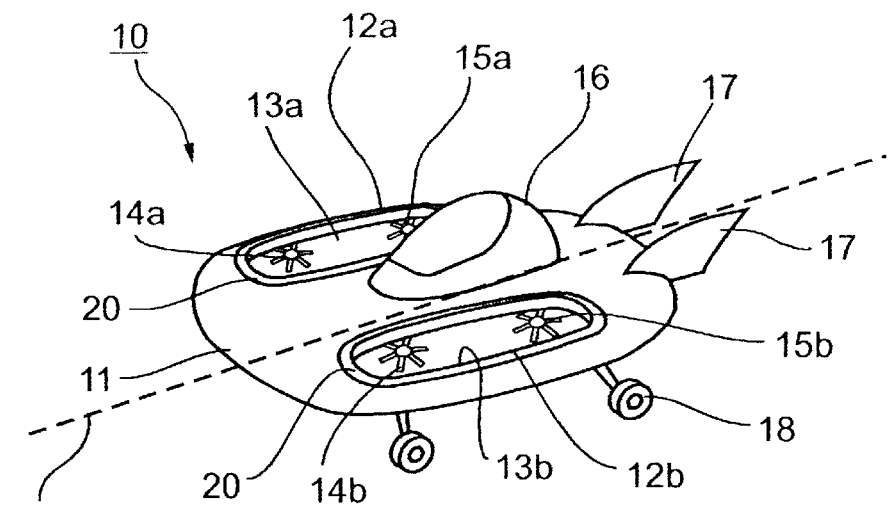
FIG. 1 is a three-dimensional view illustrating one form of VTOL aircraft vehicle constructed in accordance with the present invention.

FIG. 1 illustrates a VTOL (Vertical Take-off and Landing) aircraft vehicle, generally designated 10, including a vehicle body or fuselage 11 carrying two ducted propulsion units 12a, 12b on opposite sides of the horizontal longitudinal axis $LA_{VB}$ of the vehicle body. Each of the ducted propulsion units 12a, 12b includes an elongated duct 13a, 13b, and a pair of rotary propellers 14a, 14b and 15a, 15b, respectively mounted within and enclosed by the respective elongated duct 13a, 13b. The vehicle illustrated in FIG. 1 further includes a payload, in the form of a cabin 16, a pair of vertical stabilizers 17, and landing gear 18.

The ducted propulsion units 12a, 12b, in the vehicle illustrated in FIG. 1 include rotary propellers 14a, 14b, 15a, 15b mounted with their rotary axes perpendicular to the horizontal longitudinal axis $LA_{VB}$ of the vehicle body. This is more particularly shown in the diagram of FIG. 2 wherein the ducted propulsion unit is generally designated 12, and the longitudinal axes of the two propellers 14, 15 are generally designated $LA_{P1}$ and $LA_{P2}$, respectively. As further shown in the diagram of FIG. 2, the longitudinal axes $La_{P1}$, $La_{P2}$ of the two propellers 14, 15 are parallel to each other and also to the longitudinal axis $LA_{ED}$ of the elongated duct 13. Each of the propellers 14, 15 is rotated to force air through the respective elongated duct from the upper end of the duct, serving as the inlet, through the lower end of the duct, serving as an outlet, to produce an upward lift force to the vehicle.

Figure 2:
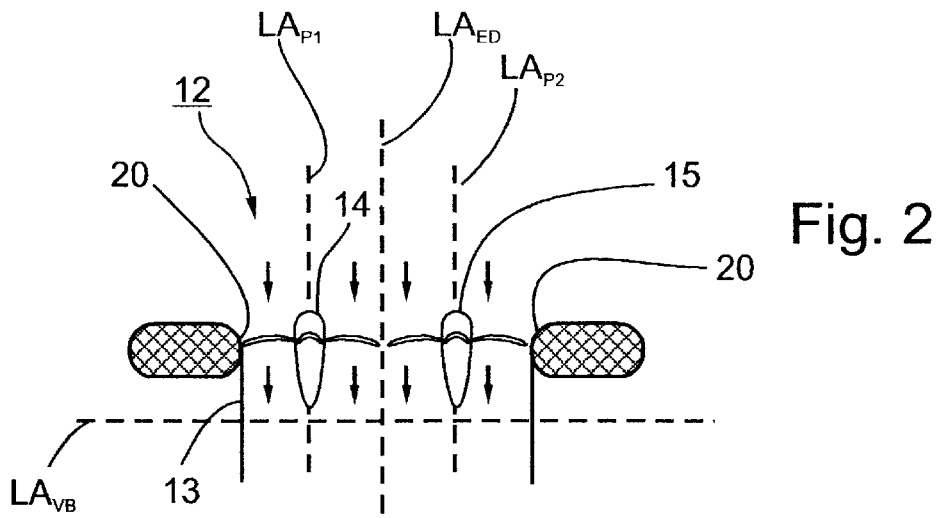
FIG. 2 is a diagrammatical view illustrating the operation of the propulsion units, in this case rotary propellers, in one of the elongated ducts in the vehicle of FIG. 1.

As shown particularly in FIG. 1, each of the elongated ducts 12a, 12b has a short transverse dimension slightly larger than the diameter of the blades (defining the cylindrical outer outline or footprint) of each of the rotary propellers 14, 15 enclosed by the respective duct. As shown in FIG. 2, each of the elongated ducts 12a, 12b has a large transverse dimension slightly larger than the sum of the diameters of the blades of both rotary propellers enclosed by the duct.

It will be appreciated that the above-described arrangement provides an important advantage over a conventional arrangement wherein each propeller is enclosed within its individual duct. Thus, because the area between the propellers is not blocked to the air flow, the overall cross-sectional area of the duct is larger than the sum of the cross-sectional areas of each of the propellers. This feature has a positive influence on the overall thrust obtained and the general efficiency of the propulsion unit. In addition, it enables a larger deck area of the vehicle to be effectively utilized for lift produced by the propellers.

The lift force produced by the propellers is further augmented by providing the upper end of each elongated duct with a convexly-curved surface circumscribing the upper end of the respective duct. This is shown in FIG. 2, wherein the curved surface at the upper (inlet) end of each duct is shown at 20. Such a curved surface augments by the Bernoulli effect the lift force produced by the propellers within the elongated duct.

Figure 3:
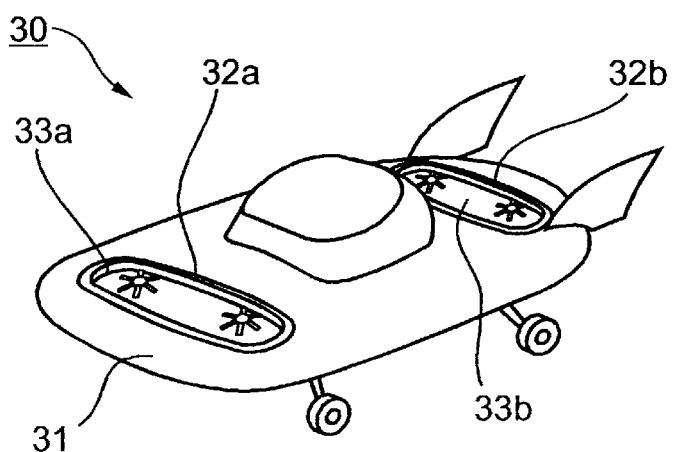
FIGS. 3, 4 and 5 are three-dimensional views illustrating three other VTOL aircraft vehicles constructed in accordance with the present invention.

FIG. 3 illustrates a VTOL aircraft vehicle, therein generally designated 30, of a similar construction as described above with respect to FIG. 1, except that the pair of ducted propulsion units 32a, 32b are oriented such that their respective elongated ducts 33a, 33b are perpendicular to the horizontal longitudinal axis $LA_{VB}$ of the vehicle body 31 rather than parallel to it as in FIG. 1. In all other respects, the vehicle illustrated in FIG. 3 is constructed and operates in the same manner as described above with respect to FIGS. 1 and 2.

Figure 4:
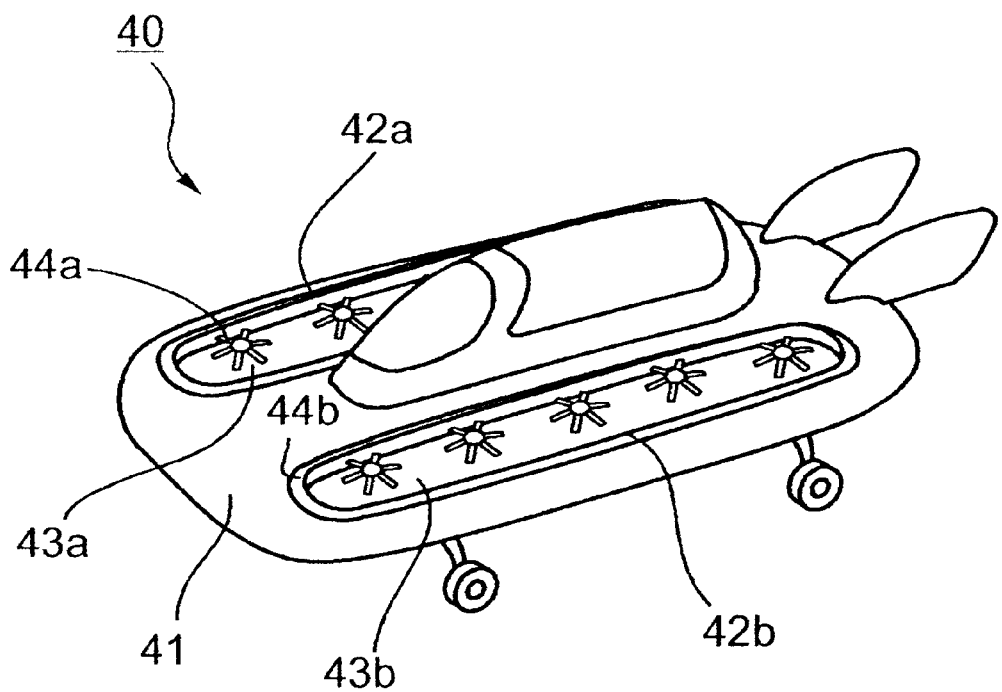

FIG. 4 illustrates a VTOL aircraft vehicle, therein generally designated 40, which is similar to that of FIG. 1 including two ducted propulsion units 42a, 42b disposed on the opposite sides of the horizontal longitudinal axis of the vehicle body 41. In the vehicle of FIG. 4, however, each of the elongated ducts 43a, 43b includes more than two rotary propellers 44a, 44b, respectively. In the example illustrated in FIG. 4, there are five rotary propellers mounted within and enclosed by each of the elongated ducts 43a, 43b.

Figure 5:
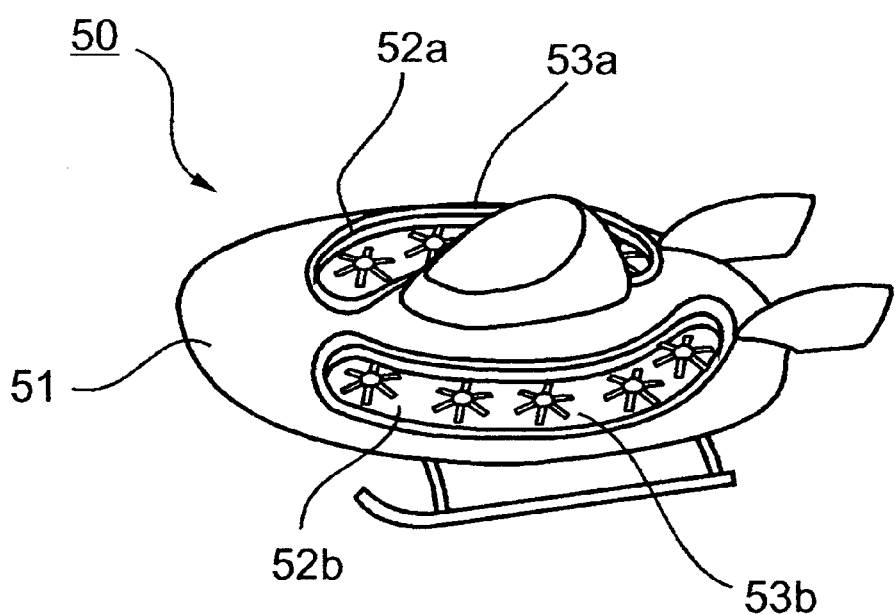

In the VTOL aircraft vehicles described above with respect to FIGS. 1–4, the elongated duct of each ducted propulsion unit is of a rectilinear configuration. FIG. 5 illustrates a variation wherein the VTOL aircraft vehicle, generally designated 50, has a pair of ducted propulsion units 52a, 52b, also located on the opposite sides of the horizontal longitudinal axis of the vehicle body 51, but in which the elongated ducts 53a, 53b are of a curvilinear configuration, rather than of a rectilinear configuration.

The above examples merely illustrate the flexibility in design provided by the invention for utilizing the maximum available deck area on the vehicle body for creating lift forces, as well as facilitating access to the passenger compartment. A possible additional benefit is that, because some propellers end up being further from other propellers, a simplified control system can be had by merely modifying differentially the thrust produced by each propeller with respect to the ones on opposite sides of the vehicle.

Figure 6:
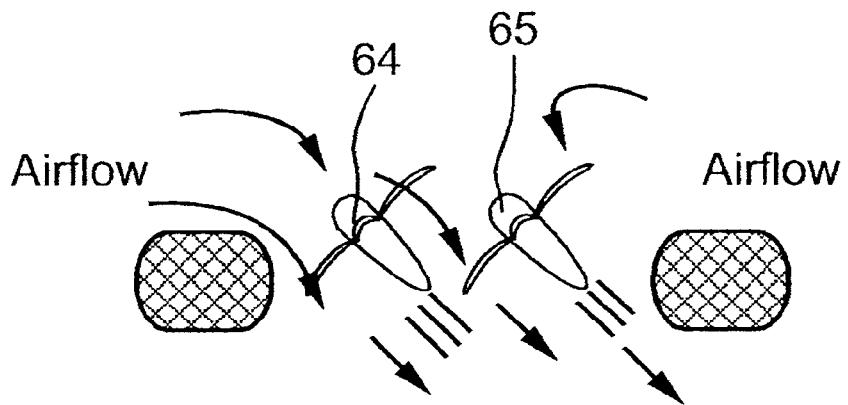
FIG. 6 is a diagrammatical view illustrating the operation of the rotary propellers in one elongated duct when swivelly mounted, rather than when fixedly mounted as in FIG. 2.

In the above-described embodiments of the invention, the rotary propellers (e.g., 14, 15, FIG. 1) are mounted within their respective elongated ducts with their rotary axes fixed perpendicularly to the horizontal longitudinal axis $LA_{VD}$ of the vehicle body, as shown particularly in the diagram of FIG. 2. FIG. 6 illustrates a variation wherein the rotary propellers, therein designated 64, 65, are swivelly mounted to enable them to produce lift forces having horizontal components for propulsion in the horizontal direction. An additional benefit of swiveling the propellers is that this permits more complete control of the vehicle. For example, if the propellers are swiveled differentially between one side of the vehicle and the other, a pure yawing moment can be generated, thereby eliminating the need for yaw-moment-generating guide vanes which are generally necessary on the other vehicle configurations described earlier.

Figure 7:
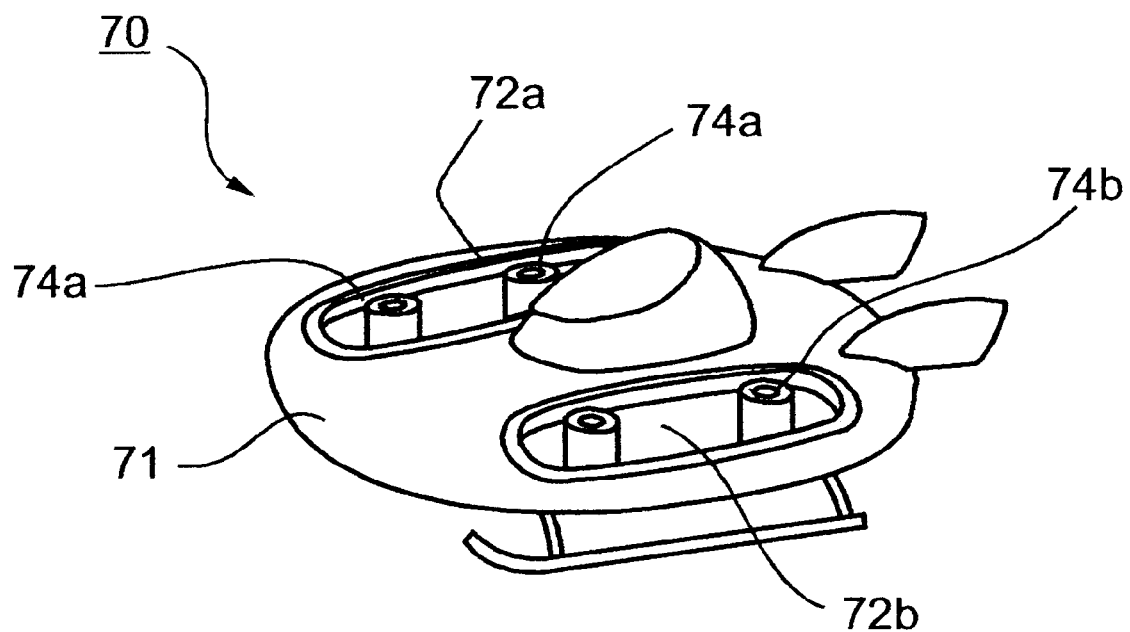
FIG. 7 illustrates another VTOL aircraft vehicle constructed in accordance with the present invention and equipped with propulsion units in the form of jet engines rather than propellers.

FIG. 7 illustrates a VTOL aircraft vehicle, therein generally designated 70, which is of a similar construction as described above with respect to FIGS. 1 and 2, including two ducted propulsion units 72a, 72b on opposite sides of the horizontal longitudinal axis of the vehicle body 71. However, instead of using rotary propellers for propulsion, the vehicle of FIG. 7 uses jet engines 74a, 74b for propulsion, both mounted within and enclosed by the respective elongated duct 73a, 73b.

It will be appreciated that any of the foregoing arrangements described with respect to FIGS. 1–6 may use the jet engines of FIG. 7. Also, while the invention has been described above particularly with respect to VTOL aircraft vehicles, it will be appreciated that the invention, or various aspects of the invention as described above, can also be advantageously used with other types of vehicles, such as sea vehicles to provide propulsion and/or directional control to the vehicle.

Accordingly, while the invention has been described with respect to several preferred embodiments, it will be understood that these are set forth merely for purposes of example, and that many other variations, modifications and applications of the invention may be made.

What is claimed is:

1. A vehicle movable in a fluid medium, comprising:
   a vehicle body;
   a first group of rotary propeller propulsion units mounted on one side of the vehicle body, each of said rotary propulsion units being oriented to produce a downward flow of the fluid and thereby an upward lift force applied to that side of the vehicle body;
   a second group of rotary propeller propulsion units mounted on the opposite side of the vehicle body, each of said latter rotary propeller propulsion units being oriented to produce a downward flow of the fluid, and thereby an upward lift force applied to said opposite side of the vehicle body;
   a first elongated duct on said one side of the vehicle body enclosing all the rotary propeller propulsion units of said first group and having an upper end and a lower end projecting past the upper and lower ends of said enclosed rotary propeller propulsion units;
   and a second elongated duct, separate from said first elongated duct, located on said opposite side of the vehicle body and enclosing all the rotary propeller propulsion units of said second group, said second elongated duct having an upper end and a lower end projecting past the upper and lower ends of said second group of rotary propeller propulsion units;
   the cross-sectional area of each of said first and second elongated ducts being larger than the sum of the cross-sectional areas of the plurality of rotary propeller propulsion units enclosed by the respective elongated duct, to augment the lift force produced by the respective rotary propeller propulsion units;
   the ends of said first and second elongated ducts being spaced from each other to facilitate entry and exit from said vehicle.

2. The vehicle according to claim 1, wherein the upper inlet end of each elongated duct is circumscribed by a curved surface which guides smoothly the fluid flow into the duct to further augment the lift force produced by the rotary propeller propulsion units.

3. The vehicle according to claim 1, wherein each of said elongated ducts has a short transverse dimension slightly larger than the diameter of the outer outlines of each rotary propeller propulsion unit enclosed thereby, and a large transverse dimension slightly larger than the sum of the diameters of the outer outlines of all the rotary propeller propulsion units enclosed thereby.

4. The vehicle according to claim 1, wherein each elongated duct is of a rectilinear configuration.

5. The vehicle according to claim 1, wherein each elongated duct is of a curvilinear configuration.

6. The vehicle according to claim 1, wherein each rotary propeller propulsion unit is fixedly mounted within its respective duct with its longitudinal axis perpendicular to the horizontal longitudinal axis of the vehicle body.

7. The vehicle according to claim 1, wherein each rotary propeller propulsion unit is swivelly mounted within its respective duct with its longitudinal axis pivotal with respect to the horizontal longitudinal axis of the vehicle body.

8. The vehicle according to claim 1, wherein there are two of said rotary propeller propulsion units mounted within and enclosed by each elongated duct.

9. The vehicle according to claim 1, wherein there are at least three rotary propeller propulsion units mounted within and enclosed by each elongated duct.

10. A VTOL aircraft vehicle, comprising:
   a vehicle body;
   a first group of rotary propeller propulsion units mounted on one side of the vehicle body, each of said propulsion units being oriented to produce a downward flow of the air and thereby an upward lift force applied to that side of the vehicle body;
   a second group of rotary propeller propulsion units mounted on the opposite side of the vehicle body, each of said latter propulsion units being oriented to produce a downward flow of the air, and thereby an upward lift force applied to said opposite side of the vehicle body;
   a first elongated duct on said one side of the vehicle body enclosing all the rotary propeller propulsion units of said first group and having an upper end and a lower end projecting past the upper and lower ends of said enclosed propulsion units;
   and a second elongated duct, separate from said first elongated duct, located on said opposite side of the vehicle body and enclosing all the rotary propeller propulsion units of said second group, said second elongated duct having an upper end and a lower end projecting past the upper and lower ends of said second group of propulsion units;

the cross-sectional area of each of said first and second elongated ducts being larger than the sum of the cross-sectional areas of the plurality of rotary propeller propulsion units enclosed by the respective elongated duct, to augment the lift force produced by the respective propulsion units;

the ends of said first and second elongated ducts being spaced from each other to facilitate entry and exit from said vehicle.

11. The VTOL aircraft according to claim 10, wherein the upper inlet end of each elongated duct is circumscribed by a curved surface which guides smoothly the air flow into the duct to further augment the lift force produced by the rotary propeller propulsion units.

12. The VTOL aircraft according to claim 10, wherein each of said elongated ducts has a short transverse dimension slightly larger than the diameter of the blades of each rotary propeller propulsion unit enclosed thereby, and a large transverse dimension slightly larger than the sum of the diameters of all the rotary propeller propulsion enclosed thereby.

13. The VTOL aircraft according to claim 11, wherein each elongated duct is of a rectilinear configuration.

14. The VTOL aircraft according to claim 11, wherein each elongated duct is of a curvilinear configuration.

15. The VTOL aircraft according to claim 11, wherein each rotary propeller propulsion unit is mounted within its respective duct with its rotary axis fixed perpendicularly to the horizontal longitudinal axis of the vehicle body.

16. The VTOL aircraft according to claim 11, wherein each rotary propeller propulsion unit is swivelly mounted within its respective duct with its rotary axis pivotal with respect to the horizontal longitudinal axis of the vehicle body.

17. The VTOL aircraft according to claim 11, wherein said pair of elongated ducts are disposed parallel to the longitudinal axis of the vehicle body.

18. The VTOL aircraft according to claim 11, wherein said pair of elongated ducts are disposed perpendicularly to the longitudinal axis of the vehicle body.

* * * * *